April 21, 1931. P. J. SEFERLIS 1,801,643
LIQUID LEVEL INDICATOR
Filed Aug. 14, 1926
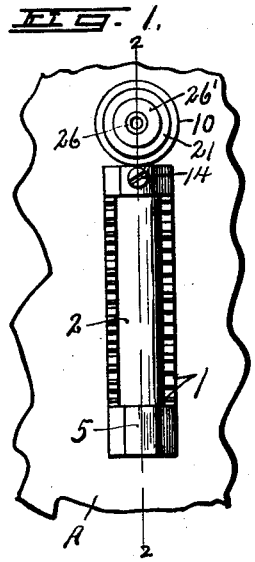
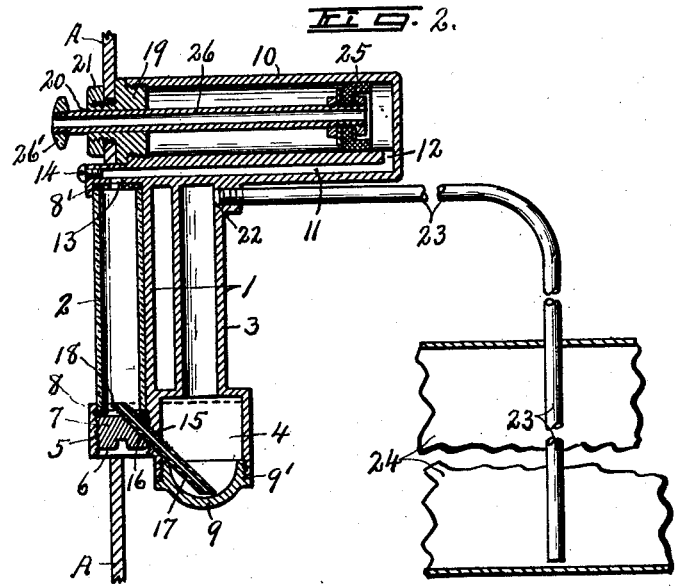
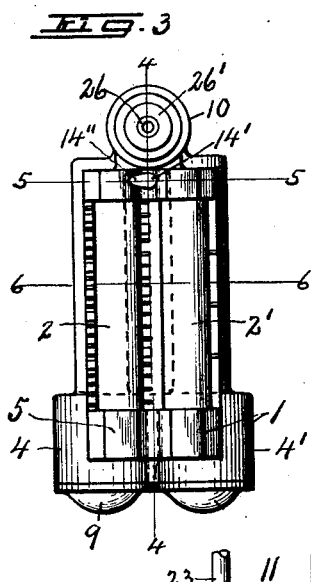
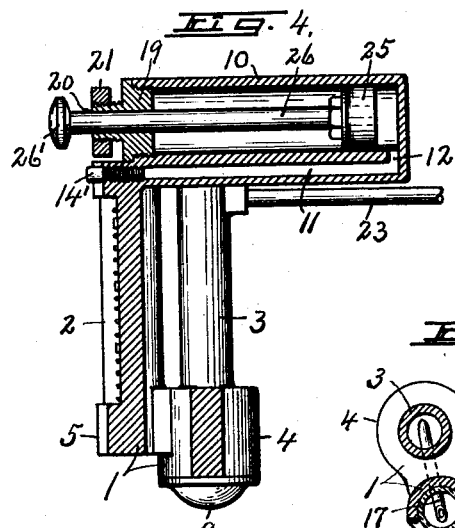
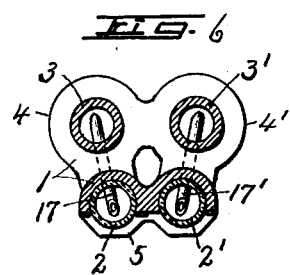
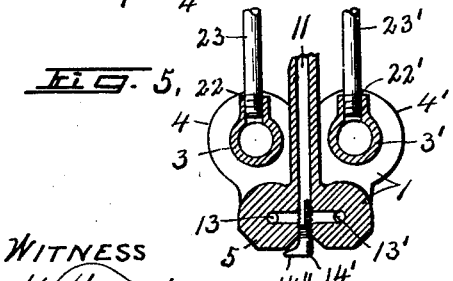
INVENTOR.
P. J. Seferlis
BY
ATTORNEYS.
WITNESS Patented Apr. 21, 1931

1,801,643

UNITED STATES PATENT OFFICE

PETER J. SEFERLIS, OF CORTLAND, NEW YORK

LIQUID-LEVEL INDICATOR

Application filed August 14, 1926. Serial No. 129,266.

This invention relates to a liquid depth or level gage of the class set forth in my Patents No. 1,560,350, November 3, 1925, and No. 1,575,284, March 2, 1926, in that it is adapted to be mounted upon the instrument board or other suitable part of a motor vehicle where it is readily visible by the operator for determining the amount of liquid such as gasoline, or other liquid fuel, although it is equally applicable for other uses in which it is desired to ascertain the amount of liquid in a reservoir.

In the devices set forth in the patents referred to the gage is provided with a suitable stand pipe or tubular column for receiving one end of a pipe having its other end connected to the reservoir containing the liquid, the depth or level of which is to be measured or ascertained through the medium of the gage, said stand pipe or tubular column having its lower end connected to a supplemental reservoir which in turn is connected to a suitable depth or level indicating device of the float and dial type as shown in the earlier patent or of the tubular gage type shown in the later patent.

These gages also include means whereby air may be forced through the indicating device and its connections with the main reservoir to overcome any inaccuracies of the reading of the gage due to the effect of varying temperatures of any of the connections between the main supply tank and gage and while all of these adjuncts are found to be highly efficient I have found that the efficiency of such apparatus may be greatly increased by certain improvements forming the subject matter of the present invention.

For example, one of the objects is to connect the supplemental reservoir with the tubular sight gage by means of a straight restricted tube having one end disposed in the supplemental reservoir near the bottom thereof and its other end extending into the sight tube or gage and terminating at the zero graduation thereto to assure a more accurate reading or indication of the depth of the liquid in the main reservoir.

Another object is to construct the gage in such manner that convenient access may be had to both the sight tube and the stand pipe for cleansing purposes and also to facilitate the placing and removal of the connecting tube between the supplemental reservoir of the stand pipe and sight tube.

A further object is to provide simple means whereby the liquid in the gage tube may be replenished when desired.

Another object is to provide means whereby a plurality of gages for liquids for different liquid reservoirs may be combined in a unitary structure and the accuracy of measurement in both controlled by a single pump or equivalent means for displacing the liquid from the gage.

Other objects and uses relating to specific parts of the apparatus will be brought out in the following description.

In the drawings:—

Figure 1 is a face view of a single gage and adjacent portion of the instrument upon which it is mounted, broken away.

Figure 2 is a vertical sectional view taken on line 2—2, Figure 1, showing in section a portion of the main liquid supply reservoir and pipe connections between said reservoir and the stand pipe of the gage, said pipe connection being partly broken away to indicate that the gage may be used in relatively remote or proximate relation to the reservoir.

Figure 3 is a face view of a plural gage for indicating the depth or level of liquids in different reservoirs by embodying the same principle of operation as that shown in Figures 1 and 2.

Figure 4 is a vertical sectional view taken on line 4—4, Figure 3.

Figures 5 and 6 are horizontal sectional views taken on lines 5—5 and 6—6 respectively, Figure 3.

These sight gages are adapted to be mounted upon an instrument board as —A— or any other suitable part of a motor vehicle where it is conveniently visible to the operator and, as illustrated, in Figures 1 and 2 preferably comprises a one-piece cast metal frame —1—, a sight tube —2—, said frame being provided with an upright stand pipe —3— and a horizontal cylinder —10—, the lower end of the stand pipe being enlarged to form a supplemental reservoir —4—.

The enlarged lower end or base of the stand pipe —3— is provided with a rearwardly extending offset —5— having a vertical opening —6— therethrough for receiving the lower end of the sight tube or gage —2— and a suitable screw plug —7— together with a suitable packing —8— between the upper end of the plug —7— and lower end of the sight tube to form a liquid and air tight joint between them.

The enlarged lower end or base of the stand pipe —3— is threaded internally for receiving a screw cap —9— which may be removed and replaced at will and forms a liquid tight joint with the lower end of the reservoir —4— through the medium of suitable packing —9'—.

The lower wall of the cylinder —10— extends rearwardly over the upper end of the gage tube —2— and is provided with a cylindrical socket in its underside for receiving the upper end of said tube and a suitable packing —8'— to form a liquid and air tight joint between those parts.

This lower side or portion of the cylinder —10— is thickened and provided with a lengthwise passage —11— extending from end to end of the cylinder and having one end connected by a branch passage —12— to the interior of the corresponding end of the cylinder and its other end communicating through a branch passage —13— with the interior of the upper end of the sight tube —2—, said passage —11— being extended through the front end of the lower wall of the cylinder and is provided with a closure —14— preferably in the form of a screw or equivalent device which may be removed when desired to replenish the liquid in the sight tube —2— and supplemental reservoir —4— by the use of a hand dropper or other device inserted in the screw openings.

The reservoir —4— is of greater diameter than the interior of the stand pipe —3— and sight tube —2— and extends some distance below the lower end of the sight tube and underlying portion of the base of the frame —1— to permit convenient manipulation of the cap —9—, the upright partition wall between the supplemental reservoir —4— and opening —6— for the lower end of the sight tube —2— and screw plug —7— is provided with a diagonally extending opening —15— registering with a corresponding diagonal opening —16— in the adjacent side of the plug —7— for receiving a straight connecting tube —17— having a passage of small diameter therethrough.

The lower end of this connecting tube —17— when placed in operative position extends into close proximity to the bottom wall or cap —9— of the supplemental reservoir —4— while its upper end extends into the lower end of the sight tube —2— and terminates at approximately the level of the upper face of the extension —5— or at the zero graduation of the sight tube.

The upper face of the plug —7— when adjusted for use is disposed in a horizontal plane slightly below the upper face of the extension —5— to form a relatively small liquid pocket —18— surrounding the portion of the upper end of the connecting tube —17— which projects through and above the upper face of the plug —7— so as to establish and maintain an accurate reading for the liquid in the sight tube and to prevent complete expulsion of the liquid therefrom by the operation of the pump piston, presently described.

The rear end of the cylinder —10— is threaded internally for receiving a threaded bushing —19— having a reduced threaded rear end —20— which extends through an opening in the instrument board —A— and is clamped thereto by means of a nut —21— thereby firmly holding the entire gage in operative position upon the instrument board.

The front wall of the upper end of the stand pipe —3— is provided with a branch passage —22— which is connected to one end of a feed pipe —23— having its lower end extended into a main supply reservoir as —24— containing the liquid to be measured, said feed pipe being preferably extended to a point in proximity to the bottom of the reservoir so as to assure the measurement of the liquid therein at all levels.

A suitable piston —25— is reciprocally movable within the cylinder —10— and is provided with a tubular stem —26— extending therethrough from end to end, said stem being extended through a central opening in the bushing —19— and is provided with an operating handle —26'— by which the piston may be reciprocated, said piston —25— and its cylinder —10— constituting what may be termed a hand pump, the object of which is to replenish the air supply entrapped between the liquid in the reservoir —4— and tank —24— when necessary or desirable to assure accuracy of indication of the depth gage particularly in cases where the accuracy of indication is affected by varying atmospheric temperatures as will be hereinafter more fully explained.

The construction shown in Figures 3 to 6 inclusive is substantially the same as that shown in Figures 1 and 2 except that the frame is enlarged sufficiently to receive a plurality of, in this instance two, stand pipes —3— and —3'— and a corresponding number of suplemental reservoirs —4— and —4'—, sight tubes —2— and —2'— and restricted connecting tubes —17— and —17'—, the upper ends of the stand pipes being connected by separate tubes —23— and —23'— to separate reservoirs containing the same or different liquids, the depth or level of which is to be indicated by their respective sight tube.

When two of these indicating devices are used in the same unit the liquid in both sight tubes —2— and —2'— may be replenished through the lengthwise opening in the stem —26— of the piston —25— by simply withdrawing said piston outwardly and then injecting the liquid through the central passage therein into the front end of the cylinder and thence through the branch passage —12—, main passage —11— and branch passage —13— into one or the other of the sight tubes as regulated by an adjusting screw or valve —14'— as shown more clearly in Figure 5.

Substantially one-half of the inner end of this valve —14'— is cut away while the remaining half extends across the adjacent ends of opposite alined branch passages —13— and —13'— leading to the upper ends of their respective sight tubes —2— and —2'— so that when the valve —14— is turned to one position communication will be established between one of these branch passages as —13'— and the main passage —11— and at the same time cutting off communication between said main passage and the other branch passage.

Or, when adjusted to a third position, both branch passages will be in open communication with the main passage —11—.

The outer end of the valve —14— constitutes a handle by which it may be turned and is provided with a pointer —14"— to indicate the position of the valve and preferably faces in the direction of the opening side of the valve.

When the main supply tank or reservoir is empty or substantially so, as indicated in Figure 2, the liquid in the sight tube —2— will recede therefrom through the pipe —17— into the reservoir —4— until it reaches the level of the upper end of the pipe —17— at which time a relatively small quantity of the liquid in the sight tube —2— will be retained in the bottom thereof or in the pocket —8— to the level of the upper end of the pipe —17— which is the zero level in the sight tube indicating that the tank is empty.

Now, when liquid to be measured is introduced into the main supply tank —24—, it will gradually rise in the upright portion of the tube —23— thereby trapping the air in the tube 23 and stand pipe —3— in contact with the gage liquid in the reservoir —4— and force said gage liquid from said reservoir thru the pipe —17— and into the sight tubes —2— a distance corresponding to the level of the liquid to be measured in the main supply reservoir —24—.

The sight tube or tubes are suitably graduated to indicate units of liquid measurement and, under normal conditions, the varying level of the liquid in the sight tube or tubes will accurately indicate fluctuations of the level of the liquid in the main supply tank but, in case the reading of the sight tube should be erroneous for any reason as, for example, by abnormal expansion of the air entrapped in the pipe —23—, the piston of the pump may be drawn outwardly and the outer end of its tubular stem closed by the finger or thumb and then pushed inwardly to force the liquid from the sight tube —2— into the reservoir —4—, thus raising the level of the liquid in the reservoir —4— and causing the entrapped air to displace the liquid from the lower end of the tube —23— until it enters the main tank —24— from which it may be vented through the usual vent provided in tanks of this character.

Then, by removing the finger from the outer open end of the tubular stem —9— permits the liquid from the main reservoir —24— to re-enter the adjacent end of the pipe —23— thereby compressing the air in the tube —23— and stand pipe —9— and thereby forcing the liquid from the supplemental reservoir —4— back through the restricted tube —17— in the sight tube —2— to indicate the level of the liquid in the main supply reservoir —24— thus completing the cycle of operation which is the same for both the single and double indicators.

The interior diameter of the pipe leading from the main supply tank to the stand pipe is preferably smaller than that of the sight tube while the diagonal pipe —17— connecting the reservoir —4— with the lower end of the sight tube is relatively smaller than the pipe leading from the main supply tank to the stand pipe to assure greater accuracy of measurement.

For example, if the tank —24— is empty the pressure of the air in the tube —23— and stand pipe —3— will be relieved thus permitting the up flow of the liquid in the reservoir —4— and a corresponding down flow of the liquid in the sight tube —2— through the restricted tube —17— to the same level as that in the reservoir thus indicating by the sight tube the emptiness of the tank.

The maximum capacity of the reservoir —4— is approximately equal to the capacity of the sight tube —2— from the lower end of the tube —17— to the top of the sight tube so that it may ebb and flow from the reservoir into the sight tube and vice versa as the level of the liquid in the reservoir varies.

When the tank —24— is filled it traps the air in the tube —23— and stand pipe —3— thereby depressing the level of the liquid in the reservoir —4— and forcing it through the restricted tube —17— into the sight tube —2— thus giving an accurate indication in the sight tube of the level of the liquid in the tank.

In the event that the air in tube —23— is expanded because of heat, some of the air, due to the expansion, will escape through passage —13— and piston stem 26', or the air will escape from the submerged end of tube —23— and thence out through the vent in tank 24 depending upon the relation of the head of the liquid in tank 24 to the head of the liquid in tube 2. The result will be that when the cause for the expansion of the air in tube —23— is removed the air will contract resulting in an inaccurate reading on the scale. Under these conditions it is necessary, in order to reset the device for accurate measurement, to replace in tube —23— the air which was lost through expansion, and this is accomplished in the following manner: The piston 25 is drawn outwardly and a finger or thumb placed over the end of the piston stem 26' to close the opening therethrough. The piston 25 is then forced inwardly compressing the air in front of it against the liquid in sight tube 2 which will cause this liquid to be forced downwardly through restricted passage 17' into reservoir 4 at which time the compressed air will pass upwardly through the liquid into tube 23. An excess amount of air thus forced into tube 23 will depress the liquid in tube 23 and the excess air will escape from the submerged end of tube 23.

What I claim is:—

In a device for indicating the level of liquid in a container, an upright reservoir, a pipe with relatively small diameter, communicating with said reservoir and extending downwardly into said container near the bottom thereof, an upright sight-tube having a bottom wall disposed in a plane some distance above the bottom of the reservoir, a conduit extending from the interior of the reservoir near the bottom thereof through the bottom of the sight-tube and having its upper end terminating within the sight-tube an appreciable distance above the bottom thereof to determine the zero level of the liquid therein and also to allow a limited quantity of the liquid to be trapped in the lower end of the sight-tube when the level of the liquid in the sight-tube is depressed to the level of the upper end of the conduit.

In witness whereof I have hereunto set my hand this 12th day of August, 1926.

PETER J. SEFERLIS.